(12) United States Patent
Noack

(10) Patent No.: US 6,527,827 B2
(45) Date of Patent: Mar. 4, 2003

(54) THERMOMEMBRANE METHOD AND DEVICE

(76) Inventor: Andreas Noack, Gothaerstrabe 4 a, D-63322 Rodermark (DE)

(*) Notice: Subject to any disclaimer, the term of this patent is extended or adjusted under 35 U.S.C. 154(b) by 0 days.

(21) Appl. No.: 09/843,285

(22) Filed: Apr. 26, 2001

(65) Prior Publication Data

US 2002/0002903 A1 Jan. 10, 2002

Related U.S. Application Data

(63) Continuation-in-part of application No. PCT/EP99/08069, filed on Oct. 26, 1999.

(30) Foreign Application Priority Data

Oct. 26, 1998 (DE) .......................... 198 49 216

(51) Int. Cl.⁷ .............................. B01D 53/22
(52) U.S. Cl. .................. 95/45; 95/289; 96/4; 96/10; 96/221
(58) Field of Search .................. 95/45, 47–55, 95/289; 96/4, 7–11, 221

(56) References Cited

U.S. PATENT DOCUMENTS

| | | |
|---|---|---|
| 3,960,769 A | 6/1976 | Munzner et al. |
| 3,979,330 A | 9/1976 | Munzner et al. |
| 4,349,356 A | 9/1982 | Wakao |
| 4,528,003 A * | 7/1985 | Dittrich et al. ............. 96/4 |
| 4,685,940 A | 8/1987 | Soffer et al. |
| 5,225,080 A * | 7/1993 | Karbachsch et al. ...... 96/4 X |
| 5,288,304 A * | 2/1994 | Koros et al. ............ 96/10 X |
| 5,411,720 A * | 5/1995 | Neuhaus .................. 96/4 X |
| 5,649,996 A | 7/1997 | Soffer et al. |
| 5,895,519 A * | 4/1999 | Lorimer .................. 96/4 X |
| 6,004,374 A * | 12/1999 | Rao et al. ............... 96/4 X |
| 6,036,746 A * | 3/2000 | Scovazzo et al. ......... 96/8 X |
| 6,139,810 A * | 10/2000 | Gottzmann et al. ....... 96/8 X |
| 6,299,669 B1 * | 10/2001 | Koros et al. ............ 96/8 X |

FOREIGN PATENT DOCUMENTS

| | | |
|---|---|---|
| DE | 21 19 829 | 11/1972 |
| DE | 32 25 751 | 1/1984 |
| DE | 36 18 426 | 7/1987 |
| DE | 39 18 430 | 12/1990 |
| EP | 0 358 110 | 8/1989 |
| EP | 582 184 | 2/1994 |
| EP | 606 306 | 11/1995 |
| EP | 428 052 | 1/1998 |
| GB | 1 572 796 | 8/1980 |
| WO | Wo 94/23814 | 10/1994 |
| WO | WO 96/09877 | 4/1996 |
| WO | WO 97/35805 | 10/1997 |

OTHER PUBLICATIONS

G. Savage, Carbon–Carbon Composites, Chapman and Hall, London, 1993, p. 85 ff.
W. Benzinger, et al., Carbon 1996, 34, p. 1465.
Fuel 1981, vol. 60, p. 817ff.
Esp@cenet Abstract of DE 3918430.
Esp@cenet Abstract of DE 3225751.
Esp@cenet Abstract of DE 0358110, A3.

* cited by examiner

Primary Examiner—Robert H. Spitzer
(74) Attorney, Agent, or Firm—Vidas, Arrett & Steinkraus

(57) ABSTRACT

The invention relates to a method for separating a fluid mixture consisting of at least two components. The inventive method comprises the following steps: contacting the fluid mixture at a first, lower temperature in a first operating zone with a carbon membrane which is arranged adjacent to a surface of a porous transport matrix or which is applied on a surface of the matrix, whereby at least one fluid component is adsorbed and at least one component of the fluid mixture preferably permeates the membrane; heating a surface spatially distant from the membrane and/or a part of the porous transport matrix to a second, higher temperature which facilitates the thermal desorption of adsorbed components in a second operating zone; separately removing the fluid mixture depleted by the at least one permeated component from the first operating zone and the fluid mixture enriched with the at least one permeated component from the second operating zone. The invention also relates to a device for carrying out the inventive method.

34 Claims, 2 Drawing Sheets

FIGUR 1
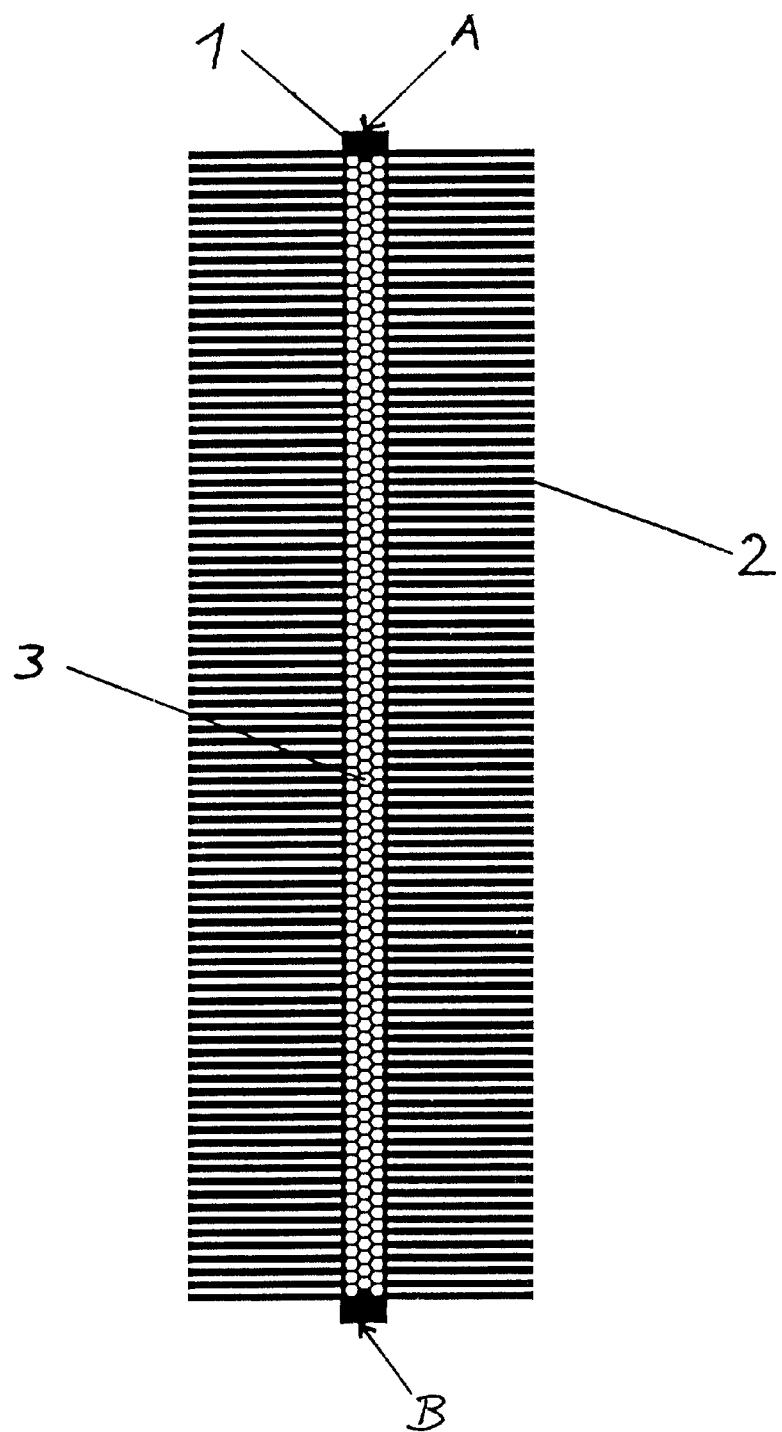

FIGUR 2
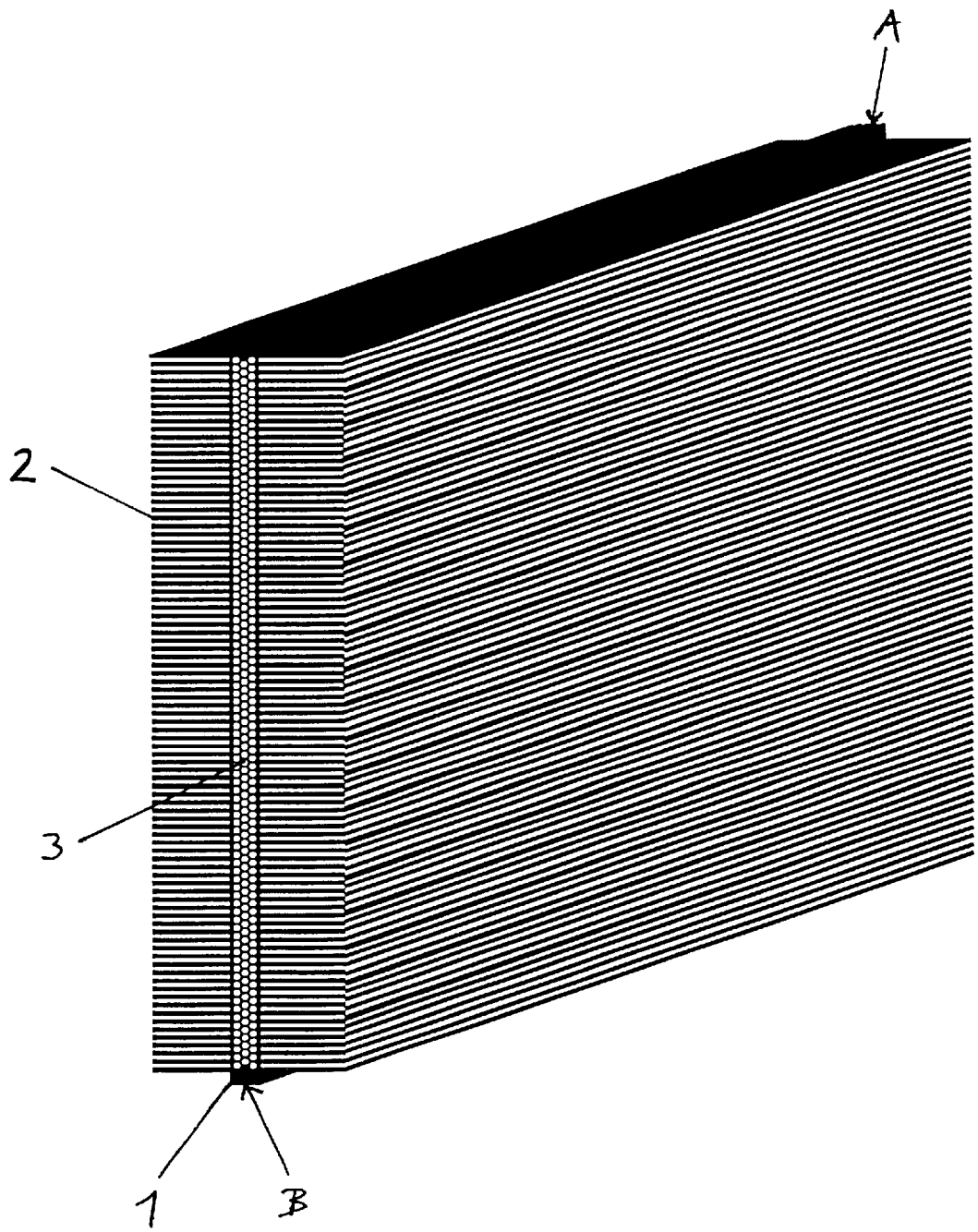

THERMOMEMBRANE METHOD AND DEVICE

CROSS-REFERENCE TO RELATED APPLICATIONS

This application is a continuation-in-part application of International Application No. PCT/EP99/08069, the contents of which is hereby incorporated by reference, which has an International filing date of Oct. 26, 1999, and which claims priority to DE application No. 198 49 216.2 filed Oct. 26, 1998.

This invention pertains to a method to separate fluid mixtures consisting of at least two components, the fluid mixture being separated through contact with a selectively adsorbing/permeating membrane in conjunction with a porous transport matrix utilizing basic kinetic concentration effects in combination with thermal desorption of the sorbates.

Furthermore, this invention pertains to a device to separate a fluid mixture consisting of at least two components comprising a carbon membrane system comprising a carbon membrane layer as the active zone adjacent to or on one surface of a porous transport matrix, the membrane being adjacent to a first operating zone and another surface of the transport matrix, which surface is spatially removed from the active membrane layer, being arranged adjacent to a second operating zone as well as devices to heat the surface and/or a part of the transport matrix which is adjacent to the second operating zone.

This invention also pertains to the use of the abovementioned method or of the specified device to clean polluted inflowing or outflowing air, to concentrate a component from process gases, in particular hydrogen and/or to separate air.

The separation of fluid mixtures into their components represents a very significant field of technology from an economic viewpoint. It extends from the extraction of individual components of the mixture in their purest forms to the production of product mixtures containing a least one component in concentrated form, relative to its contents in the initial mixture. Typical operational areas include the recovery of solvent vapours, the extraction of hydrocarbons and/or hydrogen from appropriate mixtures, for example following crack processes ("rectisorption processes") but also the separation of permanent gases from natural sources or technical processes, such as the separation of oxygen and nitrogen from air or the recovery of hydrogen from ammonia/hydrogen mixtures during the Haber-Bosch process or in other technical process gases.

As well, the cleaning of harmful, polluting or even toxic components from air or outflowing air requires that individual components be separated from complex fluid mixtures. In recent years such cleaning processes have become increasingly significant, such as in the cleaning of the air in industrial production facilities, e.g. in the super-clean rooms of the semi-conductor industry, or also in the feeding of purified ambient air into the interior of motor vehicles.

The separation of gas and gas/vapour mixtures as well as the separation of individual components from such mixtures is usually done technically through adsorption or recently, in conjunction with the development of selective membranes, also using permeation processes.

Adsorption utilizes the capacity of porous solids with large surfaces, such as activated charcoal, silica gel, and aluminium silicates, to concentrate gases and vapours contained in small concentrations in gas mixtures and, therefore, to separate them from the mixture.

Essentially, all known adsorption processes consist of two operating steps: adsorption and desorption. Both processes can be carried out discontinuously with stationary adsorbent layers and continuously in the countercurrent process. Adsorption usually takes place at the lowest temperatures possible because high temperatures reduce the adsorption capacity of the adsorption agent. As a rule, desorption takes place at higher temperatures at which the loaded adsorption agent is freed of the adsorbed adsorbate thermally through the injection of super-heated steam.

Pressure swing adsorption (PSA) was developed to separate permanent gases. In this process, adsorption, once again using activated charcoal in particular, is carried out from the mixture at high pressures of up to almost 10 bar because at such high pressures the gas with the higher boiling point is adsorbed better than the gas with the lower boiling point. A precise separation, for example of hydrogen and carbon monoxide, or of hydrogen and methane, can be achieved. The adsorbent is regenerated, i.e. the more strongly adsorbed gas components are desorbed, by means of a reduction in pressure in parallel flow and subsequent rinsing with low-pressure pure gas. In this discontinuous process, part of the pure gas extracted must be re-used for regeneration. PSA fluid separation is employed on an industrial scale but is too impracticable, as well as not economic enough, for many conceivable applications.

The so-called "BF process" was developed specifically to separate oxygen and nitrogen. This process utilizes the small difference in size between nitrogen and oxygen which takes effect when adsorption is carried out using such finely-pored adsorbents that the pore size is in the range of the critical molecular diameter. At that point the difference in molecular sizes has a great effect on the diffusion velocity in the adsorbent. It has been found, for example, that the velocity determining step in the adsorption of oxygen from an oxygen/nitrogen mixture on carbon molecular sieves with pore diameters in the 0.5 nm to 0.7 nm range is the so-called surface diffusion, which depends on the molecular size and, in particular, on the electron density. Despite similar equilibrium loadings for nitrogen and oxygen, oxygen is adsorbed much more quickly. Accordingly, a discontinuous process has been proposed which is similar to the PSA process and in which air is passed through an adsorber charged with activated coke for a short period under light excess pressure. First the oxygen is adsorbed. The relevant oxygen-loaded adsorber is then evacuated in order to draw off the oxygen. Where two adsorbers in parallel connection are used, one of which is always loading and the other unloading, a quasi-continuous process can be carried out that delivers an oxygen-rich gas containing approximately 50 to 55% oxygen. If part of the desorbed rich gas is fed back to rinse the relevant parallel operating adsorber, an oxygen concentration of up to about 80% by volume can be achieved.

German patent DE 36 18 426 as well as EP 606 306 of Bergwerksverband GmbH [Mining Association PLC] describe the production of carbon molecular sieves such as are used in the PSA or BF processes to extract nitrogen from air. As a rule, high-density, especially finely-pored activated charcoal granulates with apparent densities greater than 500 g/l are used in these processes.

The membrane separation process based on the basic operation of permeation is another method to separate gases and gas/vapour mixtures as well as to concentrate individual components or to separate individual components from such mixtures. Partially permeable, selectively operating membranes are used in this method to separate complex gas or gas/vapour mixtures. In addition to made-to-measure synthetic polymers, the materials for the required fixed membranes also include, among others, inorganic materials, like porous glass or glass ceramic, graphite, graphite oxide, and similar materials.

It has also been proposed that oxygen-rich gases be obtained by means of air separation on membranes. A significant problem with this is the unfavourable volume operation in comparison to liquid phase applications.

U.S. Pat. No. 4,349,356 describes a method to concentrate a component from a gas mixture on porous glass membranes in accordance with the principle of Knudsen diffusion. With this method the gas mixture is fed to the membrane in the form of a pulse and the permeated gases are suctioned off at specific time intervals. The enrichment factor is both time and pore size dependent, the motive force once again being the pressure difference. Adsorption processes play no role in the method described in U.S. Pat. No. 4,349,356.

Separation processes using a combination of adsorption and membrane separation mechanisms are also known in the prior art.

A continuously operating gas separation process at membranes is described in EP 428 052 for example. In this method a semi-permeable composite membrane is used which consists of a thin porous substrate covered with a porous adsorption material. The basic function of the porous substrate is to guarantee a mechanical carrier and a defined pore size for the porous membrane precipitated on it.

The gas separation process described in EP 428 052 is based essentially on the pressure difference applied, i.e. on the fact that the fluid mixture is pressed on the membrane under high pressure, parts of the fluid mixture being adsorbed selectively on the composite membrane and reaching the other side as a result of surface flow where they are suctioned off in a partial vacuum or desorbed through a reduction in the pressure. The carrier substrate does not affect these processes, it is inert. A low thickness of the composite membrane, less than 20 pm, is essential for this process to be implementable, because otherwise the permeation velocities of the adsorbed components are too low.

An essential disadvantage of this process of the prior art is that the concentration of species which it is difficult to desorb (e.g. water, compounds with high boiling points, like xylene, naphthalene, $SO_2$, $H_2SO_4$, etc.) reduce the selectivities considerably. For example, the fluid mixtures used must be virtually free of water because water occupies the adsorption sites on carbon membranes, reducing greatly the selectivity and permeability of such systems. In order to remove the water, pressure gradients that are definitely higher and that increase in the course of the process must be developed in order to remove the adsorbed water. Substances with high boiling points virtually cannot be removed at room temperature and poison the membrane successively. This restricts very greatly the area of application of membranes like those described in EP 428 052. For example, partial vacuums of up to −50 mbar must be used to remove water in discontinuous processes, which is usually not possible in continuous processes for process-engineering reasons.

The use of analogous composite membranes to concentrate hydrogen is described in EP 582 184. In this patent, the membrane separation process described in EP 428 052 is used in combination with the traditional PSA process. In this case, too, the above disadvantages of membrane poisoning result.

U.S. Pat. No. 5,649,996 describes a process to separate gases using molecular sieve membranes (MSM) made of activated charcoal fibres. In order to achieve the required selectivity and the higher separating sharpness, this process must be carried out at cryogenic temperatures of below −200 C. However, at such low temperatures, a much larger pressure gradient must be applied to the membrane in order to desorb the permeate. This restricts considerably both the applicability as well as the economic efficiency of this process. In addition, the gases are also precleaned in this process in order to keep water, substances with high boiling points, and other substances which it is difficult to desorb away from the membrane.

U.S. Pat. No. 4,685,940 describes the manufacture and use of carbon membranes with defined pore sizes and distribution. They are used for the sieve-like separation of gas mixtures in accordance with the molecular diameter. The carbon membranes are precipitated on inert porous carriers. In this case, too, a pressure difference is established by means of the membrane. Furthermore, only two-component mixtures are used for separation with this method. However, the membranes described in U.S. Pat. Nos. 5,649,996 and 4,685,940 are not suitable in the main for the method of this invention.

Consequently, there is a great need to make available membrane separation processes which overcome the prior-art disadvantages described, especially with respect to the selectivity of the membranes remaining unaltered for a long period.

In addition, a substantial and continuously increasing need for concentrated and pure gases make it absolutely necessary that the costs of the corresponding separation processes be reduced. Therefore, on account of their high energy costs, pressure gradient processes, particularly pressure swing processes, are especially disadvantageous for the compressing and decompressing of gases. As well, the recovery of educt gases from process gas mixtures of industrial production systems for the purpose of feeding them back into the production process is necessary and desirable both for economic as well as ecological reasons but depends basically on the investment and operating costs of the required separation processes. The technically equivalent case of the selective depletion of individual, for example harmful, components of a gas or gas/vapour mixture requires separation processes that are as inexpensive as possible.

As a result, there is a great need to make available an inexpensive separation process for the concentration or depletion of gases from appropriate mixtures.

In the most favourable case, such a process should combine the positive characteristics of traditional adsorption methods with the special characteristics of membrane separation processes, i.e. basically allow for high separation selectivity without a cost-intensive, spatially and/or temporally-separate regeneration of the membrane or of the adsorbent being required.

Against this background, an essential problem of the invention is to make available a process to separate mixtures consisting of at least two components which is comprised of the following steps: contacting of the fluid mixture at a first, lower temperature in a first operating zone with a carbon membrane which is located adjacent to a surface of a porous transport matrix or applied to a surface of the matrix in which case at least one fluid component is adsorbed and at least one adsorbed component of the fluid mixture preferably permeates through the membrane; heating of a surface spatially distant from the membrane and/or a part of the porous transport matrix to a second, higher temperature which facilitates the thermal desorption of adsorbed components into a second operating zone, separate removal of the fluid mixture depleted of the at least one permeated component from the first operating zone and of the fluid mixture enriched by the at least one permeated component from the second operating zone and using inexpensive means to create a continuous or quasi-continuous process for the extraction or separation of at least one fluid component.

The inventive process shall make possible a high selectivity and yield of the separation or concentration with low energy and construction costs.

A further essential problem of the invention is the provision of a device to separate fluid mixtures consisting of at least two components, comprising a carbon membrane system, which comprises an active membrane layer located adjacent to a surface of a porous transport matrix or applied to a surface of a porous transport matrix and further devices to substantially selectively heat the transport matrix on the low pressure side of the membrane system and/or parts of the membrane layer while operating the device thus allowing the abovementioned separation processes to be realized.

Moreover, an essential problem of the invention is the creation of a device which, with a high degree of efficiency and the appropriate dimensions, allows one or more components to be separated from inflowing or outflowing air or from process gases.

The process-related problems are solved by the characteristics of the two following processes:

1) A process to separate a fluid mixture consisting of at least two components which is comprised of the following steps: contacting of the fluid mixture at a first, lower temperature in a first operating zone with a carbon membrane which is located adjacent to a surface of a porous transport matrix or applied to a surface of the matrix in which case at least one fluid component is adsorbed and at least one adsorbed component of the fluid mixture preferably permeates through the membrane; heating of a surface spatially distant from the membrane and/or a part of the porous transport matrix to a second, higher temperature which facilitates the thermal desorption of adsorbed components into a second operating zone, separate removal of the fluid mixture depleted of the at least one permeated component from the first operating zone and of the fluid mixture enriched by the at least one permeated component from the second operating zone.

2) A process to separate a fluid mixture consisting of at least two components which is comprised of the following steps: contacting of the fluid mixture at a first, lower temperature in a first operating zone with an active membrane layer of a carbon membrane system comprising pyrolytic carbon as the most frequent component by weight, and wherein the carbon membrane system additionally comprises a porous transport matrix being in contact with the active membrane layer, in which case at least one fluid component is adsorbed and at least one adsorbed component of the fluid mixture preferably permeates through the active membrane layer into the transport matrix; heating of an area spatially distant from the permeation site of the membrane, and/or a part of the porous transport matrix and/or a part of the membranesystem to a second, higher temperature which facilitates the thermal desorption of adsorbed components into a second operating zone, separate removal of the fluid mixture depleted of the at least one permeated component from the first operating zone and of the fluid mixture enriched by the at least one permeated component from the second operating zone.

Advantageous embodiments of the inventive process are defined in the process subclaims.

The device-related problems are solved by the characteristics the process in accordance with one of the previously addressed process steps being carried out several times one after the other on several membrane/transport matrix structural assemblies connected in series behind one another.

In a first aspect, the inventive process for the separation of a fluid mixture consisting of at least two components is comprised of the following steps:

contacting of the fluid mixture at a first, lower temperature in a first operating zone with a carbon membrane which is located adjacent to a surface of a porous transport matrix or applied to a surface of the matrix in which case at least one fluid component is adsorbed and at least one adsorbed component of the fluid mixture preferably permeates through the membrane;

heating of a surface spatially distant from the membrane and/or a part of the porous transport matrix to a second, higher temperature which facilitates the thermal desorption of adsorbed components into a second operating zone, separate removal of the fluid mixture depleted of the at least one permeated component from the first operating zone and of the fluid mixture enriched by the at least one permeated component from the second operating zone.

The above mentioned steps are substantially carried out simultaneously in the inventive process.

In a second aspect, the inventive process for the separation of a fluid mixture consisting of at least two components is comprised of the following steps:

contacting of the fluid mixture at a first, lower temperature in a first operating zone with an active membrane layer of a carbon membrane system comprising pyrolytic carbon as the most frequent component by weight, and wherein the carbon membrane system additionally comprises a porous transport matrix being in contact with the active membrane layer, in which case at least one fluid component is adsorbed and at least one adsorbed component of the fluid mixture preferably permeates through the active membrane layer into the transport matrix;

heating of an area spatially distant from the permeation site of the membrane, and/or a part of the porous transport matrix and/or a part of the membranesystem to a second, higher temperature which facilitates the thermal desorption of adsorbed components into a second operating zone, separate removal of the fluid mixture depleted of the at least one permeated component from the first operating zone and of the fluid mixture enriched by the at least one permeated component from the second operating zone.

In a third aspect, the present invention provides a device to separate a fluid mixture consisting of at least two components, comprising a carbon membrane system, which comprises an active membrane layer located adjacent to a surface of a porous transport matrix or applied to a surface of a porous transport matrix and further devices to substantially selectively heat the transport matrix on the low pressure side of the membrane system and/or parts of the membrane layer while operating the device.

In other words the embodiment of the invention is the specific heating of the "permeate-side" and/or "low pressure side" of a carbon membrane system, in which the "permeate side" of the membrane has sorptive properties. Furthermore it has to be noted, that the inventive process steps are carried out substantially simultaneously in the inventive processes, so that adsorption, permeation, transport and desorption of the preferably permeating component takes place at the same time.

Within the present invention, the term "active carbon membrane system" refers to a system comprising a membrane layer on a porous transport matrix, wherein the membrane consist mainly—as the most frequent component by weight—of pyrolytic carbon and wherein the carbon content in the membrane is preferably larger than 50% by weight. Other elements which are preferably chemically bound to and/or are incorporated into the carbon membrane are e.g. O, H, N, Si, S, P, Ti; further impurities (lower 5% by weight) with minor effects on the carbon membrane can also be incorporated wherein no element is excluded.

The inventive device to separate a fluid mixture consisting of at least two components is comprised of an active carbon membrane layer adjacent to a surface of a porous transport matrix, the active membrane layer being adjacent to a first operating zone of the matrix and another surface of the transport matrix which is spatially removed from the membrane being adjacent to a second operating zone, as well as of devices to heat the surface and/or a part of the transport matrix adjacent to the second operating zone.

The active membrane layer has a thickness between 50 nm and 100 $\mu$m, typically it has a thickness of 1 $\mu$m. The transport matrix, which functions to stabilize the membrane system, has a thickness of 1–300 $\mu$m, typically about 10–30 $\mu$m. The transport matrix builds about 90% of the carbon membrane system, thus the bulk properties of the carbon membrane system reflects mainly the properties of the porous transport matrix.

Furthermore, the mean distance between the site where the adsorbing species is permeating through the active membrane layer and the other site where it irreversibly desorbs from the membrane system lies between 1 mm and 5000 mm and preferably between 5 mm and 500 mm.

The transport matrix for the inventive method or the device consists of porous materials having adsorption properties similar to those of activated charcoal, normally porous activated charcoal itself. This can be used in any form, for example in the form of plates and/or tubes or also of bulk material. Especially preferred is the use of extrusion-moulded bodies. Their manufacture has been known for a long time in the prior art (in this regard see, for example, Fuel 1881, Vol.60, pp. 817ff., DE 21 19 829, DE 36 18 426). Activated charcoal moulded parts are normally produced through the compression of coal/binder mixtures followed by sintering and steam activation.

Especially preferred as transport matrix material is sintered activated charcoal with a density of 0.2–1.8 g/l, preferably 0.6–1.2 g/l, and a BET surface at least 1 m$^2$/g, preferably at least 10 m$^2$/g, more preferably at least 50 m$^2$g, especially preferred at least 100 m$^2$/g, and most preferably at least 500 m$^2$/g.

Such sintered activated charcoal materials facilitate a high surface mobility of the adsorbed components. Furthermore, such activated charcoal material is especially suitable for the installation of drilled boles on the desorption side for the placement of electrical heat conductors for example.

However, a large number of other porous adsorbents might be used as transport matrix material, such as aluminosilicates, zeolites, silica gels of all kinds, etc. provided they guarantee the transport of the permeated components through the substantially identical molecular movement mechanism, particularly through surface flow and/or the flow of pore-condensed fluids.

In an especially preferred embodiment, the transport matrix is an active membrane itself In order to produce channels for the removal of the permeate/desorbate within the transport matrix, substances with low melting points, for example metals, can be embedded prior to compression of the coal/binder mixture. These substances melt during sintering and run out, producing the appropriate hollow spaces.

The transport matrix useable with the inventive method must be combined with an activated charcoal membrane which itself is preferably membranized on a surface. In this case, too, many methods have been known in the prior art for a long time.

In most cases, so-called CVD processes (chemical vapour deposition) are used to produce carbon membranes. For this purpose the carrier, in the case of this invention the transport matrix, is treated with hydrocarbon-separating compounds at high temperatures (see G. Savage, Carbon-Carbon Composites, Chapman and Hall, London, 1993, p. 85 ff., U.S. Pat. Nos. 3,960,769; 3,979,330). Almost all known saturated and unsaturated hydrocarbons with sufficient volatility are suitable as hydrocarbon-separating compounds. Examples of these are methane, ethane, ethylene, acetylene, linear and branched alkanes, alkenes, and alkynes with carbon numbers of $C_{1-20}$ aromatic hydrocarbons like benzene, naphthalene, etc., single and multiple alkyl-, alkenyl-, and alkinyl-substituted aromates such as toluene, xylene, cresol, styrene, etc., and the like. These are used in CVD and CVI processes, usually in low concentrations in an inert gas such as $N_2$, argon, or the like. It is also possible to add hydrogen to the relevant separation gas mixtures.

In order to distribute the precipitated activated charcoal membrane more uniformly on the matrix, the so-called CVI process (Chemical Vapour Infiltration, for example, see also W. Benzinger et al., Carbon 1996, 34, p. 1465), which is described in the literature and is well-known to the experts, is used in the standard manner, in which during precipitation of the membrane the decomposition gases are suctioned onto the surface of the transport matrix by means of a continuous vacuum ("forced flow CVI"). This results in an essentially homogeneous pore structure being maintained in the activated charcoal membrane. This homogenization of the pore structure by means of forced flow CVI also increases the mechanical strength of the membrane. Optionally, after the CVI membranization, a further sintering step can be carried out at temperatures up to 1600° C. in order to further stabilize the homogenization and strength of the membrane.

As well, where the permeability of the resulting membrane is too low, the pore system can be expanded subsequently by wetting the membrane briefly with an oxidizing agent, e.g. $HNO_3$, and then treating it thermally.

In an especially preferred embodiment, the membranized transport matrix is made with the use of paper production technology. The inventors have found, that multiply folded paper sheets, optionally stamped with a structure of parallel grooves, can be transformed into stable carbon bodies with high outer surface and/or membrane area under oxygen-free pyrolysis conditions. These paper-based bodies can subsequently be membranized with a carbon membrane using CVD and/or CVI-processes.

In a first step a fiber containing paper basestock comprising preferably long natural, synthetic and/or semi-synthetic fibers is manufactured by suitable paper production technology. The random fiber structure provides a sufficient porosity of the final charcoal body after carbonization under oxygen-free pyrolysis conditions.

Suitable natural fibers may be selected from the group consisting of abaka, bamboo, hemp, cellulose, amylose, starch, polyose, lignine, flax, jute, sisal, coconut, kenaf, ramie, rosella, sunn, urena, linen, cotton, kapok, as well as fibers of grain-straw, alfagrass, espartograss, fique, henequen, manila, phormium, bargasse, linters and the like.

Suitable semi-synthetic fiber materials are selected from the group consisting of sulphate pulp, sulfite pulp, sodium pulp; cellulosic derivatives like cellulosic ester, ether and acetate; alginate, viscose, copper silk, polyisoprene and the like.

Suitable synthetic fiber materials are selected from the group consisting of homo- and copolymers of polyacrylonitrile, polyvinyl alcohol, polyethylene, polypropylene, polyamide, polyester, polyurethane, and glass fibers, glass microfibers and the like.

Preferably utilized within the present invention are papers selected from the group consisting of abaka long fiber paper, teabag paper, linen paper, deckle-edged paper, print paper, filter paper, blotting paper, wood-free paper, kraft paper, crepe, cardboard, LWC-paper, oil paper, overlay paper, wrapping paper, recycled paper, synthetic fiber paper, soft paper and the like.

Especially preferred are stamped and pleated papers with a volume-related surface area of at least 1,000 $m^2/m^3$, preferably at least 10,000 $m^2/m^3$ and most preferred of at least 20,000 $m^2/m^3$. Best mode is performed with the use of linen paper having a surface-related weight of about 20 $g/m^2$ or teabag paper (abaka fibers) having a surface-related weight of about 12 $g/m^2$.

The paper is optionally coated with additional glass- and/or carbonaceous fibers and impregnated with carbon-rich binders like bitumen, tar or suitable aromatic resins and the like, to improve the stability under pyrolysis conditions.

Further additives, like e.g. glass microfibers, silicon oxides etc. may be applied by silk-screen printing or the like onto one or both sides of the paper surfaces. These additives serve for the formation of silicon carbide or a partial Silicon incorporation into the carbon matrix on a part of the surface by carbothermic reduction processes at high pyrolysis temperatures. Minor amounts of silicon carbide advantageously increase the mechanical and chemical stability of the so-formed inventive transport matrix.

Additives like carbon black, $TiO_2$-powders and the like are also beneficial to densify the carbon matrix if necessary.

For the purpose of providing channels for the removal of the permeate/desorbate within the transport matrix, a suitable groove structure may optionally be stamped onto the paper. Preferred is a structure of substantially parallel grooves spaced with approximately 100 nm and a depth of several micrometers. Stamping may be performed either on one or on both sides of the paper sheet.

In a preferred embodiment, the membrane system is designed in the form of plates, or densely packed pleats, which have stamped-in channels to guide the feed/retentate-flow and as well the permeate flow.

In a further preferred embodiment, the second operating zone is in the form of channels in a plate or pleat-shaped transport matrix which has lamellar surfaces, both sides of which are arranged in parallel vertical to the plane of the plates or pleats, to which the carbon membrane is applied, and the number of pleats per cm is between 1 and 2000, preferably between 10 and 100.

The optionally precoated paper is then folded into package of suitable dense structure, preferably a concertina-like structure and put into a temperature-programmed pyrolysis kiln, where it is carbonized under inert gas in a substantially oxygen-free environment. The pyrolysis temperature ranges from about 100° C. to about 2000° C. Preferably, formed pyrolysis gases are sucked off during this process.

After completion of the pyrolysis, the charcoal body is membranized by a common CVD/CVI process at temperatures from about 300° C. to 1500° C. using volatile hydrocarbons like methane, higher alkanes or aromatics like benzene, toluene and the like. Preferably, benzene is used as a carbon precursor in combination with suitable amounts of hydrogen gas, water vapour and inert gases like e.g. nitrogen gas.

After cooling to room temperature, a mechanically stable charcoal transport matrix body having a carbon membrane on its surface is obtained.

A typical example for a preferred embodiment made by paper technology may be prepared as follows:

A linen paper (about 20 $g/m^2$) is coated on one side with 5 $g/m^2$ carbon fibers and 5 $g/m^2$ of glass fibers and then impregnated with 200 $g/m^2$ of bitumen and 2 $g/m^2$ of phenolic resin (dissolved in xylene). A mixture of 80% (by weight) of $SiO_2$ powder and 20% (by weight) of phenolic resin is then printed onto the fiber coated side of the paper in a diagonal pattern of about 5 micrometer height by means of silk-screen printing. Then, diagonal grooves are stamped onto the paper surface. The edges of the paper are then coated with a phenolic resin/xylene solution, and two of these papers are put against each other and are bonded at the resin coated edges with each other. This two paper package is then multiply folded into a concertina-like arrangement, to obtain a folded package of about 7.5 cm height, about 20 cm width and a depth of about 15 cm with an average fold-width of 0.3 mm and about a total of 666 folds.

This folded paper package is then placed in a vacuum device and transferred into a pyrolysis kiln, where it is heated for about 1 hour to a temperature of about 180° C. under $N_2$ atmosphere and a slight subpressure.

In a second temperature treatment step, the package is carbonized for about 4 hours under $N_2$ at a temperature of 250° C. to 800° C. The gases formed during this carbonization process are continuously sucked off.

In a third step the carbonized package is then tempered at about 1600° C. for about 1 hour under $N_2$, where the carbothermic reduction of the silicon components takes place, and silicon carbide is formed.

In a fourth step the carbonized package is membranized on its outer surface with a carbon membrane by means of CVD/CVI treatment for about 3 hours at about 850° C. with a mixture of benzene and hydrogen gas. The benzene/hydrogen mixture is blown into the package at a pressure of about 20 to 50 mbar. A second gas mixture of $N_2$ and water vapor is blown in countercurrent thereto into the package, resulting in a carbon deposition mainly at those areas, where both gas streams meet each other.

The membranized package may then optionally be treated with oxidants like water vapor at a temperature of about 900° C. in order to modify the pore structure of the membrane.

After cooling off the membrane package is placed in a suitable box, provided with gas inlets and outlets, heating elements and all further equipment necessary for operating the separation device.

The inventive process of separating fluid mixtures with the use of the inventive membrane/transportmatrix system is carried out as follows: In this invention, a fluid mixture to be separated is brought into contact in a first operating zone with the active carbon membrane layer at a first lower temperature. On account of the molecular-kinetic and thermodynamic characteristics of the membrane surface, preferably at least one component is adsorbed at the active membrane layer, this means with higher selectivity than other fluid components. Depending on the nature of the component to be adsorbed, the selectivity of the adsorption can be increased through suitable pressure and temperature conditions. Low temperatures are to be preferred on the membrane surface, preferred are temperatures of minus 200° C. to approximately 200° C., especially preferred is room temperature.

In accordance with a thermodynamically and kinetically process, the adsorbed molecules begin to migrate in the direction of the lower pressure as a result of transposition processes, some of them migrating/flowing into the pore channels on the surface of the membrane, passing through the active membrane in this way.

As a rule, at least one of the adsorbed components will have a higher mobility than the other adsorbates and permeate preferentially through the active membrane into the transport matrix. This capacity for preferred permeation is the essential factor in determining the selectivity of the separation on the membrane.

The transposition processes at adsorption sites are generally described as surface flow or the flow of pore-condensed semi-liquids. Behind the membrane, the permeated components having strong sorptive properties distribute themselves on the adsorption sites of the pore system of the transport matrix. As long as there are free adsorption sites, they will be occupied by advancing molecules so that new adsorption sites are constantly becoming free on the active membrane layer which are immediately re-occupied by molecules from the fluid mixture. This thermodynamically as well as kinetically driven concentration equalization and permeation only comes to an end when all adsorption sites on the active membrane layer and in the transport matrix are occupied.

The specific advantage of the inventive system lies especially in providing a second pressure drop (besides the first one across the active membrane layer) which goes parallel with the transport matrix according to the flow characteristic at the permeate side of the membrane, e.g. in the inner parts of a pleated membrane system. This second pressure drop pushes adsorbed species towards the food of the pleat, where they are cumulated Therefore, the transport matrix fulfils multiple functions: on the one hand, it promotes the transport of permeated species through the membrane without the components having to be desorbed immediately on the back of the membrane, while also maintaining the surface flow behind the membrane by guaranteeing an unbroken chain of adsorption sites. On the other hand, as a result of the large number of adsorption sites it operates as a kind of reservoir or interim storage for adsorbed components.

The transport matrix joins the first operating zone, which is adjacent to the membrane, with a second operating zone, which is spatially distant from the membrane adjacent to the transport matrix. For example, this can be the external surface opposite to the membrane side, or also a hollow channel, a drilled hole or the like in the transport matrix. In order to desorb the adsorbed components in the second operating zone, the invention provides that the transport matrix itself, parts of the active membrane layer, the boundary surface between the transport matrix and the second operating zone and/or a part of the transport matrix adjacent to the second operating zone be heated in order to make available in this way the energy required for desorption of the sorbates.

This thermal energy can be made available in all sorts of ways, for example through heating with electrical heating conductors, induction heating, radiant heating pipes, tubular lamps, halogen lamps, any other kind of lamps, infra-red radiation, microwave radiation, passage of a heated gas or fluid over/partially through the transport matrix and similar measures known to the experts. Heating conductors jacketed with catalytically effective material can also be used with which, for example, adsorbed volatile, organic compounds are oxidized catalytically during desorption in specific applications. Especially preferred is direct heating of part of the transport matrix through attachment or installation of electrodes, provided the transport matrix is made of an electrically conductive material. Especially advantageous is direct electrical heating via the bottom of the membrane stack being fixed to a porous graphite plate, electrically conducted on two edges.

Depending on the nature of the desorbed components, the temperature applied for desorption is between −200° C. and 200° C., preferably between minus 50° C. and 150° C. Where the transport matrix is heavily occupied with substances with high boiling points, a higher temperature, up to 500° C. or more, can be used in individual cases (non-oxidative conditions).

Preferably the heating is performed in such a way, that a temperature increase of the permeate on the low pressure side in comparison to the temperature of the retentate results, which amounts to at least 1° C., preferably at least 10° C., and especially preferred at least 50° C.

The thermal desorption of adsorbed components from the transport matrix into the second operating zone results in new adsorption sites in the transport matrix being freed, disturbing the concentration equilibrium and re-stimulating the surface flow of sorbates from the membrane into the transport matrix in the course of the concentration equalization. In this way, discontinuous or continuous heating of one side of the transport matrix can produce a quasi-continuous surface flow of adsorbed components from the first into the second operating zone, resulting in a concentration of the adsorbed components from the fluid mixture in the first operating zone as well as in a corresponding concentration of these components in the second operating zone.

In this way just a small part of the active membrane layer is raised in temperature and thus the major part remains substantially cool and/or at the feed-temperature, which is favourable to the permeation process.

While operating the inventive device it has been observed, that the adsorbate accumulates mainly at the bottom of a transport matrix pleat.

The pore sizes of the membrane are between 1 and 50 Å in diameter, preferably between 2 and 10 Å, those of the transport matrix up to 10 μm.

The fundamental advantage of the invention lies in the use of thermal desorption, which, in view of the better energy balance, is not only more advantageous than 100% pressure desorption, but also facilitates the removal of substances which it is difficult to desorb by means of pressure alone, such as water, substances with high boiling points, acids, etc. As a result, the service life and selectivity of inventive devices is clearly higher than the pressure alone desorption devices known from the prior art.

The invention is specially advantageous where traces of impurities having significant higher boiling points in comparison with the preferred permeating species are cumulated and blocking the, membrane in a conventional membrane process.

The fluid mixture can also be fed into the first operating zone in the form of a pulse or alternation from excess pressure to negative pressure in order to remove non-permeating components from the membrane again or faster from the pores and the area before the membrane at which separation occurs.

The removal of fluid mixtures depleted of the preferably adsorbed components from the first operating zone after a certain contact period and of the correspondingly enriched fluids must be carried out on separate routes. In order to further increase the degree of concentration or depletion, the fluid mixtures can be brought in contact with other inventive devices in the sense of membranes connected in series. For example, the fluid mixture extracted from the first operating zone can be used as circulation gas to remove the depleted fluid mixture in the first operating zone of a membrane connected downstream and/or in parallel by managing it in a circuit. In the same way, the fluid mixture extracted from the second operating zone can be used to remove desorbed components from the second operating zone of a membrane device connected downstream and/or in parallel. Parallel supply of the flow to a large number of inventive membrane/transport matrix devices is also provided for and especially preferred in this invention.

Naturally, the inventive process and/or device can be used both to extract a gas depleted of at least one component from the first operating zone as well as to extract enriched fluid mixtures from the second operating zone. Depending on the separation problem and the properties of the fluid components as well as of the membrane, the expert will chose where the fluid mixture occurs that is of more interest to him.

The fluid mixture enriched with desorbed components can be removed from the second operating zone through the application of a partial vacuum by means of suction or by means of passing a carrier gas, which carries the desorbed components with it, through the second operating zone.

The inventive process and device can be used for a large number of separation problems, for example the separation of permanent gases in the presence of impurities, which would block the membrane otherwise. Such as the separation of air into $N_2$ and $O_2$ in the presence of humidity, the concentration of $O_2$ from air, the concentration or separation of hydrogen from industrial process gases, the concentration or separation of $D_2$ from $H_2/D_2$-mixtures, the separation of volatile hydrocarbons from inflowing or outflowing air (air purification), VOC-abatement, solvent recovery, and in general air purification and the like. It is also possible to dry gases and/or gas mixtures using the inventive method and/or device. In this regard, thermodesorption allows an almost quantitative separation of water in a very simple way.

In order to use the process for solvent recovery from VOC-laden air or the enrichment of VOCs from an off-gas stream the VOCs are in the first step when the heating is switched off concentrated in the membrane system while the permeate is recycled into the feed-stream and the VOC (volatile organic compounds) containing air is fed. When the heating is turned on the VOCs desorb from the membrane system and the VOC-rich permeate is now fed into a condenser or an incinerator device.

It is also possible to separate gas/vapour mixtures or liquid mixtures using the invention.

In addition, the invention can be used to separate inert gases, to separate isotopes from mixtures containing fluid isotopes, to separate isomers, to dry compressed air as well as to extract and/or concentrate $N_2$. The invention also provides for its being used as a preliminary stage in combination with a traditional pressure swing-adsorption process, for example for the extraction of oxygen from zeolites.

Depending on the application, the dimensions of inventive devices can be varied greatly. Small compact modules with car-battery low-voltage heating are conceivable for use as interior air filters, e.g. in motor vehicles, correspondingly large technical systems are necessary to separate air into its main components.

Essential advantages of the inventive process or a corresponding device compared to the known art are found in its structural simplicity and low structural costs, above all, because there are no moveable parts in the potential compact design nor do separate regeneration or desorption devices have to be provided. Also advantageous is the high, design-based, mechanical stability, which also allows unstable species to be desorbed in a vacuum Very high desorption temperatures can also be achieved without special materials or expensive insulations being required on the feed side.

This invention shall be explained in more detail on the basis of the following examples of the device.

DESCRIPTION OF THE FIGURES

FIG. 1 shows the profile of an inventive transport matrix with a lamellar structure.

FIG. 2 shows a perspective view of the transport matrix in FIG. 1.

FIGS. 1 and 2 show a transport matrix consisting of a central plate 1 to which lamellar surfaces 2, both sides of which are arranged parallel to one another, are attached vertically to the plane of illustration. The main plane of the lamellar surfaces is vertical to the plane of the central plate 1. The central plate 1 has macro channels 3 passing through it which form the second operating zone of the device. The lamellar surfaces 2 are membranized on the surface and the inner side contains micro channels providing a low pressure drop for the permeating fluid. This membranized surface is adjacent to the first operating zone which surrounds the exterior of the plate 1.

If electrodes are now attached to the central plate 1, for example on the two opposite sides (A, B) and electrical voltage is applied to them, the electric current flows through the central plate 1 in the shortest way, heating primarily the second operating zone of the plate where contaminants are cumulated. In this way heating of the lamellar surfaces and, therefore also of the membrane, is largely prevented.

The fluid mixture is applied to the membranized lamellar surfaces from both sides, so that the permeating components can be removed subsequently from channels 3 of the central plate 1 following thermal desorption.

In another preferred embodiment of the inventive device, the channels 3 of the central plate 1 are sealed on one side, in which case a suction pipe socket made of material which does not conduct electricity can be attached to the other end.

What is claimed is:

1. Process to separate a fluid mixture consisting of at least two components which is comprised of the following steps:

contacting of the fluid mixture at a first, lower temperature in a first operating zone with a carbon membrane which is located adjacent to a surface of a porous transport matrix or applied to a surface of the matrix in which case at least one fluid component is adsorbed and at least one adsorbed component of the fluid mixture preferably permeates through the membrane;

heating of a surface spatially distant from the membrane and/or a part of the porous transport matrix to a second, higher temperature which facilitates the thermal desorption of adsorbed components into a second operating zone, separate removal of the fluid mixture depleted of the at least one permeated component from the first operating zone and of the fluid mixture enriched by the at least one permeated component from the second operating zone.

2. Process in accordance with claim 1 characterized by the carbon membrane facilitating the permeation of the at least one adsorbed component and the transport matrix the transport of the permeated component substantially by means of the same molecular movement mechanism.

3. Process in accordance with claim 1 characterized by the permeation and transport of the at least one of the permeated components substantially by means of surface flow of the adsorbed species and/or a semi liquid flow of pore-condensed species and/or an alternating adsorption-desorption flow via the gas phase.

4. Process in accordance with claim 1 characterized by the heating being carried out by means of an electrical heating conductor and/or electrical light.

5. Process in accordance with claim 1 characterized by the heating of a part of the transport matrix and/or parts of the membrane system by direct electrical heating.

6. Process in accordance with claim 1 characterized by continuous or discontinuous heating.

7. Process in accordance with claim 1 characterized by the fluid mixture enriched with the at least one of the preferably permeated components being removed continuously or discontinuously from the second operating zone, through the application of a pressure gradient.

8. Process in accordance with claim 1 characterized by the process steps being carried out several times one after the other on several membrane/transport matrix structural assemblies connected in series behind one another.

9. Process in accordance with claim 1 characterized by a temperature increase of the permeate on the low pressure side in comparison to the temperature of the retentate of at least 1° C.

10. Process in accordance with claim 1 characterized by a mean distance between the site where the adsorbing species is permeating through the active membrane layer and the other site where it irreversibly desorbs being between 1 mm and 5000 mm.

11. Process in accordance with claim 1 characterized by the transport matrix being an active membrane itself.

12. Process in accordance with claim 1 characterized by the temperature increase of the permeate being in average at least twice the temperature increase of the retentate during the heating procedure.

13. Process to separate a fluid mixture consisting of at least two components which is comprised of the following steps:
contacting of the fluid mixture at a first, lower temperature in a first operating zone with an active membrane layer of a carbon membrane system comprising pyrolytic carbon as the most frequent component by weight, and wherein the carbon membrane system additionally comprises a porous transport matrix being in contact with the active membrane layer, in which case at least one fluid component is adsorbed and at least one adsorbed component of the fluid mixture preferably permeates through the active membrane layer into the transport matrix;
heating of an area spatially distant from the permeation site of the membrane, and/or a part of the porous transport matrix and/or a part of the membrane-system to a second, higher temperature which facilitates the thermal desorption of adsorbed components into a second operating zone,
separate removal of the fluid mixture depleted of the at least one permeated component from the first operating zone and of the fluid mixture enriched by the at least one permeated component from the second operating zone.

14. Process in accordance with claim 13 characterized by the carbon membrane facilitating the permeation of the at least one adsorbed component and the transport matrix the transport of the permeated component substantially by means of the same molecular movement mechanism.

15. Process in accordance with claim 13 characterized by the permeation and transport of the at least one of the permeated components substantially by means of surface flow of the adsorbed species and/or a semi liquid flow of pore-condensed species and/or an alternating adsorption-desorption flow via the gas phase.

16. Process in accordance with claim 13 characterized by the heating being carried out by means of an electrical heating conductor and/or electrical light.

17. Process in accordance with claim 13 characterized by the heat of a part of the transport matrix and/or puts of the membrane system by direct electrical heating.

18. Process in accordance with claim 13 characterized by continuous or discontinuous heating.

19. Process in accordance with claim 13 characterized by the fluid mixture enriched with the at least one of the preferably permeated components being removed continuously or discontinuously from the second operating zone, through the application of a pressure gradient.

20. Process in accordance with claim 13 characterized by the process steps being carried out several times one after the other on several membrane/transport matrix structural assemblies connected in series behind one another.

21. Process in accordance with claim 13 characterized by a temperature increase of the permeate on the low pressure side in comparison to the temperature of the retentate of at least 1° C.

22. Process in accordance with claim 13 characterized by a mean distance between the site where the adsorbing species is permeating through the active membrane layer and the other site where it irreversibly desorbs being between 1 mm and 5000 mm.

23. Process in accordance with claim 13 characterized by the transport matrix being an active membrane itself.

24. Process in accordance with claim 13 characterized by the temperature increase of the permeate being in average at least twice the temperate increase of the retentate during the heating procedure.

25. Device to separate a fluid mixture consisting of at least two components, comprising a carbon membrane system, which comprises an active membrane layer located adjacent to a surface of a porous transport matrix or applied to a surface of a porous transport matrix and further devices to substantially selectively heat the transport matrix on the low pressure side of the membrane system and/or parts of the membrane layer while operating the device.

26. Device in accordance with claim 25 characterized by the membrane system being designed in the form of rods, hollow fibers, wound hollow fibers, plates, or densely packed pleats, which have stamped-in channels to guide the feed-/retentate-flow and as well as the permeate flow.

27. Device in accordance with claim 25 characterized by the carbon membrane system has a BET surface of at least 1 m2/g.

28. Device in accordance with claim 25 characterized by the facilities to substantially selectively heat the transport matrix of the membrane system being comprised of radiant heating pipes, a tubular lamp, any other kind of lamps, an electrical heating conductor, indirectly heated rods and plates, an induction heating device, which can be installed in part of the transport matrix, or of direct electrical heating of an electrically conductive part of the transport matrix.

29. Device in accordance with claim 25 characterized by the temperature of the permeate being higher by at least 1° C. than the temperature of the retentate, while heating the transport matrix.

30. Device to separate a fluid mixture characterized by several devices in accordance with claim 25 being operated in series.

31. Device in accordance with claim 25 characterized by moisture containing air being brought into contact with the membrane surface in the first operating zone and oxygen enriched as well as moisture enriched air being extracted in the second operating zone.

32. Device in accordance with claim 25 characterized by the second operating zone being in the form of channels in a plate or pleat-shaped transport matrix which has lamellar surfaces, both sides of which are arranged in parallel vertical to the plane of the plates or pleats, to which the carbon membrane is applied.

33. Device in accordance with claim 32 characterized by the number of pleats per cm being between 1 and 2000.

34. Device in accordance with claim 25 characterized by an average temperature increase of the permeate in comparison to the temperature increase of the retentate during the heating phase by at least a factor of 2.

* * * * *